United States Patent [19]

Wycliffe

[11] Patent Number: 4,988,581
[45] Date of Patent: Jan. 29, 1991

[54] METAL-AIR BIPOLAR CELL UNIT

[75] Inventor: Paul A. Wycliffe, Kingston, Canada

[73] Assignee: Alcan International Limited, Montreal, Canada

[21] Appl. No.: 382,533

[22] Filed: Jul. 19, 1989

[51] Int. Cl.⁵ .............................................. H01M 4/86
[52] U.S. Cl. ...................................... 429/27; 429/210
[58] Field of Search .................................... 429/27, 210

[56] References Cited

U.S. PATENT DOCUMENTS

| | | | |
|---|---|---|---|
| 3,043,898 | 7/1962 | Miller et al. | 429/27 |
| 3,316,167 | 4/1967 | Clarke et al. | 429/210 |
| 3,598,655 | 8/1971 | Hamlen et al. | 136/86 |
| 3,682,706 | 8/1972 | Yardney et al. | 136/86 A |
| 4,184,008 | 1/1980 | Watakabe | 429/27 |
| 4,463,064 | 7/1984 | Ruch et al. | 429/27 |
| 4,507,367 | 3/1985 | Rich et al. | 429/27 |
| 4,626,482 | 12/1986 | Hamlen et al. | 429/27 |
| 4,693,946 | 9/1987 | Niksa et al. | 429/27 |

Primary Examiner—Donald L. Walton
Attorney, Agent, or Firm—Copper & Dunham

[57] ABSTRACT

A bipolar cell unit is described for use in a metal/air battery, e.g. an aluminum/air battery. Each bipolar cell unit comprises (a) an air cathode having opposed major surfaces, one of the surfaces being exposed to air and the other of the surfaces being adapted for exposure to electrolyte, (b) a metal anode comprising a metal plate having opposed major surfaces with one plate major surface positioned in spaced juxtaposed relation to the cathode surface exposed to air thereby forming an air gap between the anode and cathode, (c) structural means for connecting the air cathode to the anode plate whereby the air cathode is supported by the anode plate such that air is permitted to move through the air gap while electrolyte is excluded and (d) an electrical connection between the anode and cathode.

8 Claims, 4 Drawing Sheets

METAL-AIR BIPOLAR CELL UNIT

BACKGROUND OF THE INVENTION

This invention relates to a bipolar cell unit for use in a metal/air battery, in particular in an aluminum/air battery.

Metal/air batteries produce electricity by the electrochemical coupling of a reactive metallic anode to an air cathode through a suitable electrolyte in a cell. As is well known in the art, an air cathode is a typically sheet-like member, having opposite surfaces respectively exposed to the atmosphere and to the aqueous electrolyte of the cell, in which during cell operation atmospheric oxygen dissociates while metal of the anode oxidizes, providing a usable electric current flow through external circuitry connected between the anode and cathode. The air cathode must be permeable to air but substantially hydrophobic so that aqueous electrolyte will not seep or leak through it, and must incorporate an electrically conductive element to which the external circuitry can be connected; for instance, in present-day commercial practice, the air cathode is commonly constituted of active carbon (with or without an added dissociation-promoting catalyst) containing a finely divided hydrophobic polymeric material and incorporating a metal screen as the conductive element. A variety of anode metals have been used or proposed; among them, alloys of aluminum and alloys of magnesium are considered especially advantageous.

An example of a typical metal/air cell is shown in Hamlen et al., U.S. Pat. No. 4,626,482 issued Dec. 2, 1986. It typically comprises a tank defining a reservoir for liquid electrolyte. An air cathode is provided having opposed vertical surfaces with means for supporting the cathode for simultaneous exposure of one of its surfaces to air and the other of its surfaces to electrolyte in the reservoir. A metal anode is provided in the form of a metal plate having opposed vertical major surfaces, disposed for immersion in the electrolyte in the reservoir with one plate major surface positioned in spaced juxtaposition to the other of the cathode surfaces to define therewith an anode-cathode gap for receiving the electrolyte, and with the other plate major surface exposed to electrolyte and facing a region of the reservoir external to the gap. Circuit means are provided for connecting the anode and cathode to an external load.

The conventional air cathode is in the form of a rectangular sheetlike member having two opposed planar major surfaces, being constituted, for example, of two flat layers of an active carbon-hydrophobic polymer composition with a wire screen conductor pressed between them. In order to provide strength to the cathode, the sheetlike member must be mounted in a plastic frame with the edges securely sealed to the frame in the form of a continuous liquid-tight joint. This cathode assembly is then mounted in a framework which holds it in spaced relationship with an anode.

Such a structure is expensive and time-consuming to manufacture and is not amenable to mass production. It is the object of the present invention to provide a greatly simplified form of metal/air bipolar cell unit which will be both much less expensive and simpler to manufacture than any of the prior systems.

SUMMARY OF THE INVENTION

The present invention broadly contemplates a bipolar cell unit for a metal/air battery comprising (a) an air cathode having opposed major surfaces, one of the surfaces being exposed to air and the other of the surfaces being adapted for exposure to electrolyte, (b) a metal anode comprising a metal plate having opposed major surfaces with one plate major surface positioned in spaced juxtaposed relation to the cathode surface exposed to air thereby forming an air gap between the anode and cathode, (c) structural means for connecting the air cathode to the anode plate whereby the air cathode is supported by the anode plate such that air is permitted to move through the air gap while electrolyte is excluded and (d) an electrical connection between the anode and cathode.

Preferably, the electrical connection between the anode and cathode is an integral part of the manufacture of the unit such that no electrical connections with wires are necessary to connect the anode and cathode in a complete unit.

The air gap of the invention may be a simple empty air space or it may be a type of foam material with sufficient porosity to allow passage of enough oxygen to sustain the cathode reaction. Typically, each air gap is open at the top to allow passage of air/oxygen.

The object of providing an air gap between the anode and cathode while supporting the cathode primarily by the anode can be achieved in a number of ways as follows:

Type I

One way of mounting a cathode to an anode according to the invention is to provide a hydrophobic, electrically conductive foam material as the air gap. The foam may be fixed to the anode by a conductive adhesive and the cathode may be formed directly on the opposite face of the foam or fastened to the foam such that oxygen flow may continue from the foam to the cathode. Such a system is clearly amenable to large scale manufacture where it can be produced in large sheets and simply cut to size for a given battery.

Type II (a) In place of the conductive, hydrophobic foam of Type I, a foam may be used which is hydrophobic but non-conducting. Such a system requires a current collector between the active carbon and the foam, e.g. metal mesh, metal screen, metal coated carbon paper, metal strips, etc. In addition, some form of connection between the current collector and the anode is necessary after the anode/unit has been cut to its final shape. The necessary electrical connections may be made by conductive edges applied to each unit after it is cut to shape or connections may be made through the foam during manufacture e.g. by a polka dot pattern.

(b) It is also possible to use a non-hydrophobic, but electrically conductive foam as the air pocket. In that case the edges of each individual unit must be sealed after they have been cut.

Type III

Non-metallic spacers, e.g. corrugated plastic, corrugated cardboard, non-porous spacers at the perimeter of the unit, may be used to maintain the required air pocket. Such a system still uses the anode as the main structural member and there is no need for a rigid cathode frame.

Type IV

Support of the anode on the cathode by direct means while still creating an air pocket may be achieved by either deforming the anode material such that an air pocket will result or bending the air cathode in a suitable manner. The anode may be formed by conventional metal forming techniques such as extrusion or stretch forming of sheet material. Direct electrical connection of the air cathode to the anode material will occur by crimping or by ultrasonic welding.

Typically, a series of bipolar cell units according to the invention are arranged in spaced, juxtaposed relationship in a tank for holding a body of liquid electrolyte. When liquid electrolyte is added to the tank, the top ends of the cell units remain above the level of the electrolyte such that the open ends of the air gaps are in contact with air/oxygen. Circuit means are provided for connecting the bipolar cell units to an external load.

According to an alternative embodiment, the spaces between the bipolar cell units of this invention may, if desired, be interspersed with open celled, absorbent sponge material which will retain electrolyte, e.g. salt water, upon squeezing, partial emersion and releasing. With a given side of this stack appropriately coated, the stack may be squeezed and dipped into electrolyte such that the air gaps stay electrolyte free, while the active anode/cathode gaps absorb electrolyte. In this way no separate electrolyte container is necessary and shunt currents in a multicell unit would be reduced. Compact multicell batteries can be made in this manner.

Further features and advantages of the invention will be apparent from the detailed description hereinbelow set forth, together with the accompanying drawings.

DESCRIPTION OF THE PREFERRED EMBODIMENTS

The metal anode used in the cell unit of the invention can be any aluminum alloy typically used in an aluminum air battery system, with either a saline or alkaline electrolyte. The key feature of this invention is that the anode is the major structural member of the bipolar unit. The rigid anode causes both the foam/mesh layer or spacer and the anode surface to be both planar and stiff. An adhesive or coating may be applied to the cathode side of the anode to protect the anode from attack on that side in the event of leakage and to make electrical connections to the cathode if an electrically conductive adhesive is used. A similar adhesive or coating may be applied around the perimeter of the unit to seal the air pocket, protect the anode and/or provide electrical connection depending on the type of unit as described above. A typical adhesive for this purpose may be, for example, "Emerson and Cumings Eccobond 64C", an electrically conductive adhesive designed for use where corrosion and salt water is a problem.

The cathode surface incorporates many of the features of existing air cathodes, e.g. the outer layer may be hydrophilic active carbon containing an appropriate oxygen reducing catalyst. The active layer may be applied directly to the outer surface of the foam, e.g. by applying a mixture of binder, active carbon and catalyst. An intermediate layer such as carbon fiber paper or metal grid may be added to support the active carbon cathode surface.

According to another embodiment, it is possible to attach a complete commercially available air cathode to the outer surface of the foam. Any method of attachment of the active cathode surface to the foam layer may be used which does not block the flow of oxygen to the active layer. The foam or mesh layer must be sufficiently rigid to prevent collapse of the air pocket due to the pressure head caused by emersion of the cell unit in electrolyte.

The foam or mesh layer can be any structure through which oxygen from the air can pass quickly enough to sustain the air cathode reaction at the desired current density. Open or closed cell foam, three dimensional grid, or a sponge material may be used. Even relatively dense material such as hydrophobic material used in air cathodes may be used for narrow units which operate at low current densities, since for this configuration the distance from the edge of the unit to the electrochemically active surface is short. Air channels may be drilled or otherwise machined to improve air flow in order to give the battery improved electrical current. Air may be forced into the channels using an air pump. If the air cathode is sufficiently stiff, then a non-foam material may be used as spacer to support the cathode at three edges or possibly with additional spacers toward the middle of the unit or with a corrugated spacer.

Figure 1:
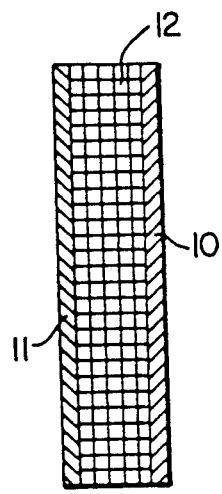
FIG. 1 is a sectional view of one embodiment of the bipolar cell unit of the invention.
Figure 2:
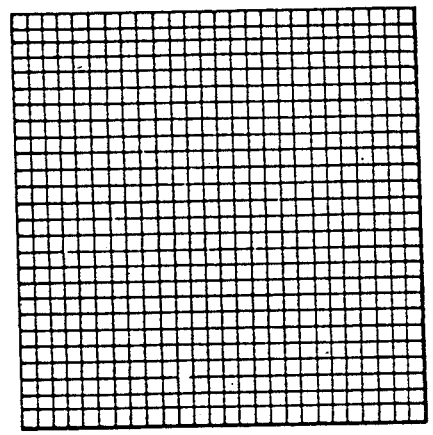
FIG. 2 is a further sectional view of the unit of FIG. 1.

The drawings illustrate several preferred embodiments of the present invention and FIGS. 1 and 2 show one of the simplest unit designs in which an aluminum alloy anode 10 is adhesively attached to a hydrophobic, conducting foam material 12 and an air cathode layer 11 is fixed to the opposite face of the foam by means of an adhesive which does not prevent passage of air from the foam into the cathode.

Figure 3:
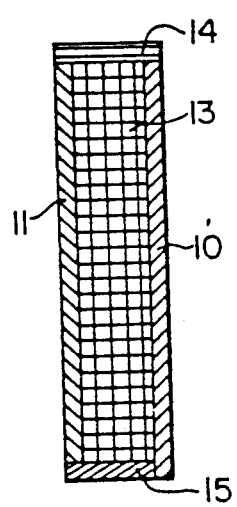
FIG. 3 is a sectional view of a further embodiment of a cell unit of the invention.
Figure 4:
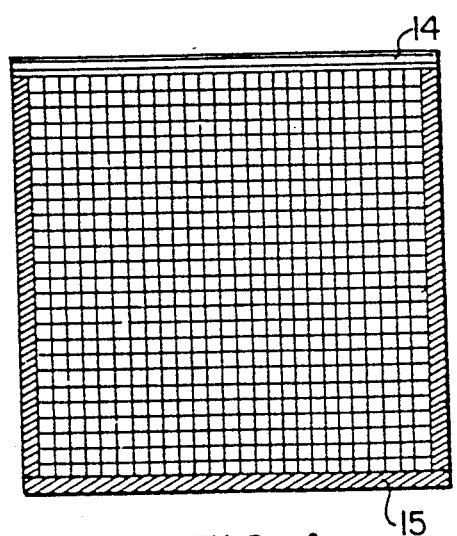
FIG. 4 is a sectional view of the unit of FIG. 3.
Figure 5:
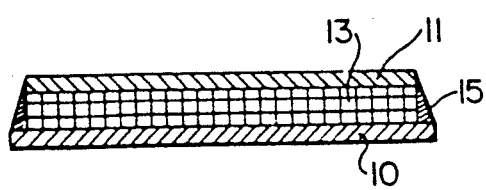
FIG. 5 is a sectional view along line V—V of FIG. 4.
Figure 6:
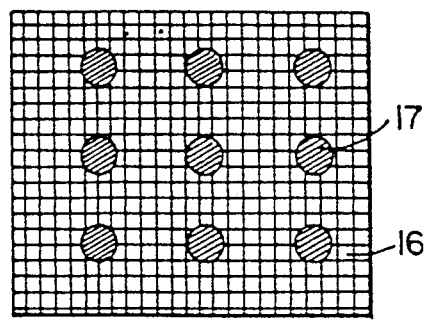
FIG. 6 is a sectional view of a non-conducting foam insert.

FIGS. 3, 4 and 5 shows a design which can be used when a non-conducting foam material 13 is used between the anode 10 and the air cathode 11. Because the foam is non-conducting, an electrical connection must be made between the anode and cathode. If the foam is also non-hydrophobic, then it is necessary to seal the edges of the unit and this can be done by means of edge seals 14 and 15. The edge seal 15 is preferably a conductive material such that it provides both a liquid seal and an electrical connection. Alternatively, the electrical connection between the anode and cathode may be made by way of connectors 17 extending through the foam 16 as shown in FIG. 6.

Figure 7:
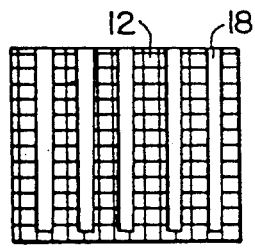
FIG. 7 is a sectional view of a foam portion with air vents.
Figure 8:
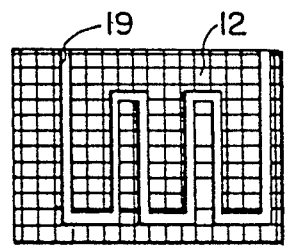
FIG. 8 is a sectional view of a foam with a winding air path.
Figure 9:
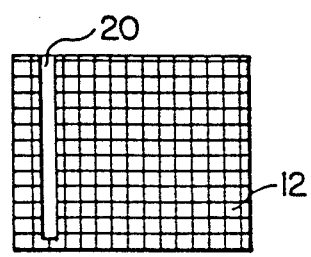
FIG. 9 is a sectional view of a foam member with a single air inlet.

It may be desirable to provide holes or channels in the foam to aid the movement of air. Three forms of holes or channels are shown in FIGS. 7, 8 and 9, with FIG. 7 showing a series of parallel spaced holes 18, FIG. 8 showing an undulating channel 19 and FIG. 9 showing a single inlet hole 20.

Figure 10:
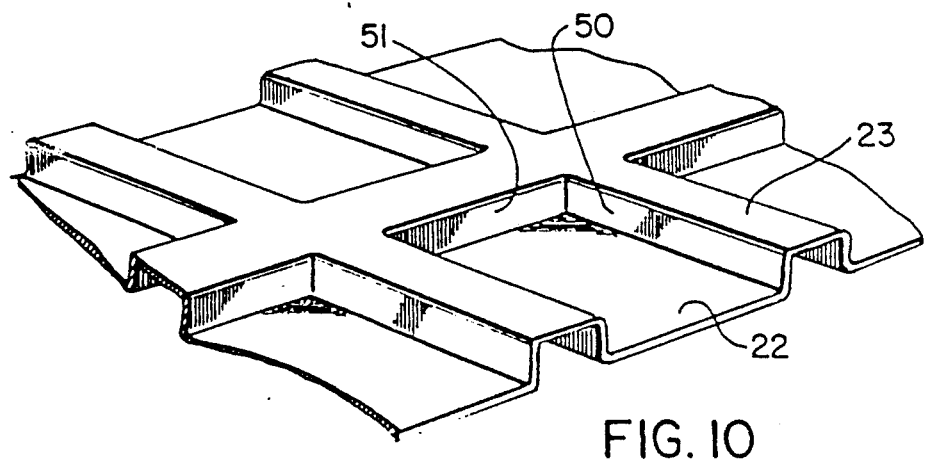
FIG. 10 is a perspective view of a formed anode sheet.
Figure 11:
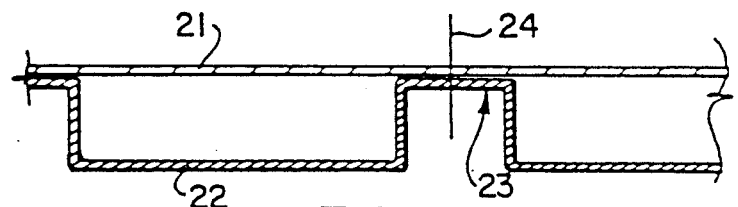
FIG. 11 shows a sectional view of a formed anode sheet with a cathode in position to be attached thereto.
Figure 12:
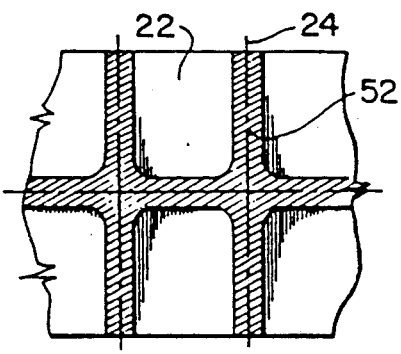
FIG. 12 is a plan view of the anode sheet of FIG. 11.

By altering the shape of the anode portion, it is possible to support the cathode on the anode by direct means. Looking at FIGS. 10-12, it will be seen that the anode sheet 22 is pressed into a grid of raised rib portions 23. Between the ribs are shallow three-sided panlike areas having a pair of side edges 50 and a bottom edge 51, the top end remaining open. A conventional air cathode 21 is then connected to the anode 22 on the ribs 23 by means of ultrasonic welding 52. This can be created in a continuous large sheet and individual smaller units may be formed by cutting along lines 24. Each of these smaller cell units then comprises three sealed edges and one open edge with integral electric connection which is then ready for insertion into a battery container.

Alternatively, the component 21 may be a metallic grid for an air cathode which is placed over the anode sheet on the ribs 23 and ultrasonically welded as described above. The air cathode can then be fabricated on the metallic grid in such a way that the unit edges are sealed as part of the cathode manufacture. The individual units are then cut from the larger sheet in the manner described above.

To obtain maximum possible use of the above units, it is useful to coat the inside surface of the anode material with a coating to prevent leakage and flooding of the units when they are dissolved electrochemically. Anode material which would be exposed to electrolyte on the cathode side of the unit should also be so coated. Units should fit snuggly into a battery container in order to minimize shunt currents.

Figure 13:
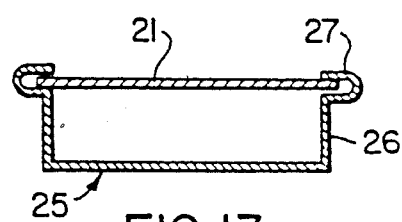
FIG. 13 is a sectional view of a further anode/cathode assembly of the invention.
Figure 14:
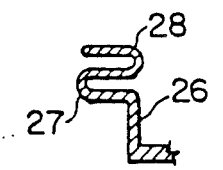
FIG. 14 is a detailed fragmentary sectional view of a portion of an anode.
Figure 16:
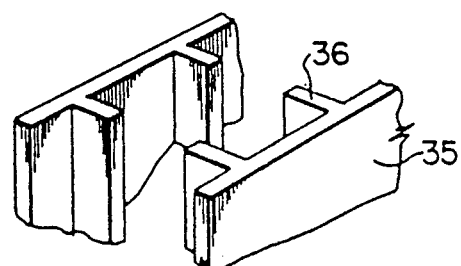
FIG. 16 is a fragmentary perspective view of battery ends.

Yet another technique for supporting an air cathode 21 on an anode is shown in FIG. 13 where the anode 25 has side edges 26 and crimped edge portions 27 adapted to firmly hold a cathode 21. The free edge of the anode may be given a further bend as shown in FIG. 14 to provide both a slot 27 to receive the air cathode and a further slot 28 which can be used for retaining the cell unit in position within a battery case. Thus, the slots 28 slide along ribs 36 inside a battery case 35 as shown in FIG. 16.

Figure 15:
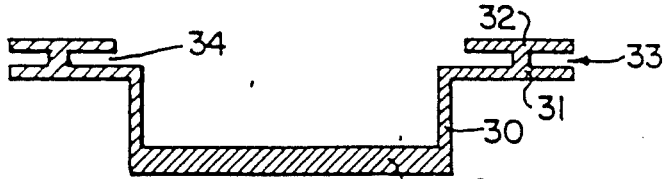
FIG. 15 is a sectional view of a special form of anode.

Another method for achieving the above purpose is shown in FIG. 15 where the anode comprises an extrusion of a thick anode plate 29 with side edges 30 and a flange portion 31 extending out from each edge portion 30. Each flange 31 has integrally formed therewith a T-shaped portion 32 which forms an outward slot 33 and an inward slot 34. The two inward slots 34 support an air cathode while the outward slots 33 can again slide along the ribs 36 for mounting in a battery.

Figure 17:
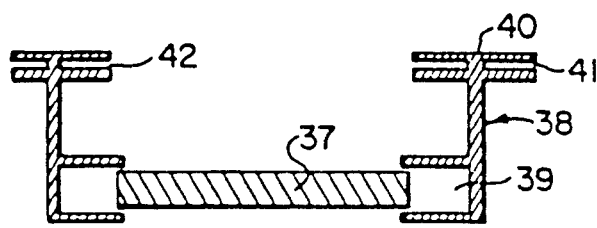
FIG. 17 is a sectional view of mounting brackets and an anode.

Another way of achieving the objective of FIG. 15 is shown in FIG. 17 where a pair of end flanges 38 are formed with slots 39 for receiving an anode plate 37, slots 42 for receiving an air cathode and slots 41 for mounting on ribs 36 of the battery.

Figure 18:
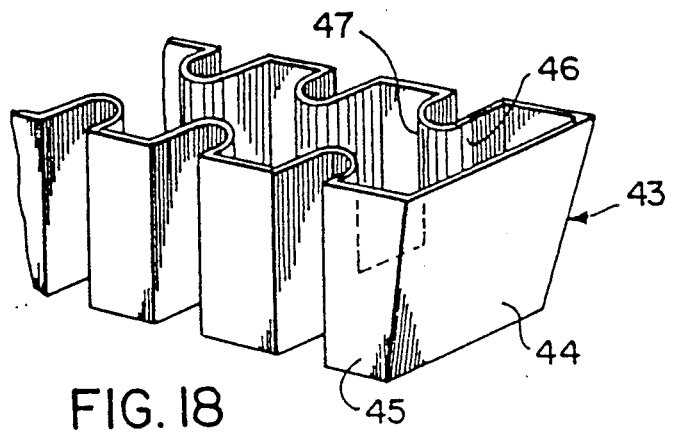
FIG. 18 is a fragmentary perspective view of a battery case.
Figure 19:
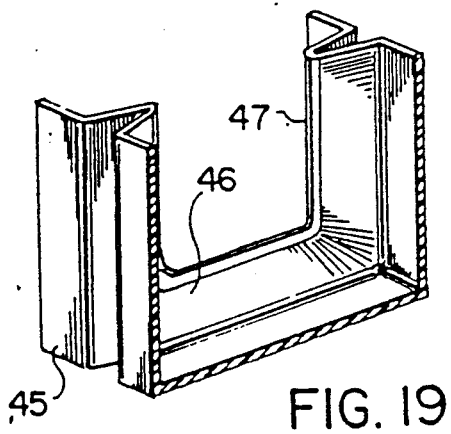
FIG. 19 is a further fragmentary perspective view of a battery case.
Figure 20:
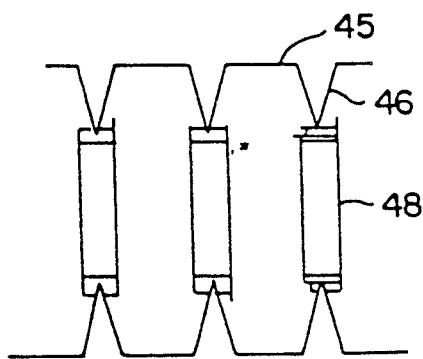
FIG. 20 is a fragmentary top plan view of a battery case holding cell units of the invention.

A battery case adapted for use with the present invention is shown in FIGS. 18-20. Thus, the battery case 43 has end walls 44 and side walls 45. The side walls 45 include inwardly projecting portions 46 and inner edges 47 adapted to receive grooves in the vertical edges of bipolar cell units of the invention.

It is to be understood that the invention is not limited to the features and embodiments hereinabove specifically set forth but may be carried out in other ways without departure from its spirit.

I claim:

1. A bipolar cell unit for a metal/air battery comprising an (a) air cathode having opposed major surfaces, one of said surfaces being exposed to air and the other of said surfaces being adapted for exposure to electrolyte, (b) a metal anode comprising a metal plate having opposed major surfaces with one plate major surface positioned in spaced juxtaposed relation to said cathode surface exposed to air thereby forming an air gap between the anode and cathode, (c) an air permeable, hydrophobic, nonconducting foam material connecting said air cathode to said anode plate whereby the air cathode is supported by the anode plate such that air is permitted to move through said air gap while electrolyte is excluded and (d) an electrical connection between the anode and cathode.

2. A bipolar cell unit according to claim 1 wherein the structural means connecting the cathode to the anode comprises an air permeable hydrophobic, electrically conductive foam material.

3. A bipolar cell unit according to claim 1 wherein the electrical connection comprises electrically conductive edge seals which seal at least one edge of the cell unit.

4. A bipolar cell unit according to claim 1 wherein the electrical connection comprises connector pieces extending through the foam between the cathode and anode.

5. A bipolar cell unit according to claim 1 wherein the structural means connecting the cathode to the anode comprises an air permeable, non-hydrophobic, electrically conductive foam material, the edges of the foam adapted for immersion in electrolyte being sealed against fluid penetration.

6. A bipolar cell unit according to claim 1, wherein the structural means connecting the cathode to the anode comprises projecting portions of an anode plate, said projecting portions holding the air cathode.

7. A bipolar cell unit according to claim 1, wherein the structural means connecting the cathode to the anode comprises edge flanges with inwardly directed slots for holding both the anode and cathode.

8. A bipolar cell unit according to claim 7 wherein the edge flanges also have outwardly directed slots for engaging vertical ribs on inner battery walls.

* * * * *